United States Patent
Raghavendra et al.

(10) Patent No.: US 9,444,947 B2
(45) Date of Patent: Sep. 13, 2016

(54) METHOD AND SYSTEM FOR DIFFERENTIAL CHARGING

(75) Inventors: Sunku Raghavendra, Bangalore (IN); Rohan Pascal Savio Goveas, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 35 days.

(21) Appl. No.: 14/363,462

(22) PCT Filed: Jan. 25, 2012

(86) PCT No.: PCT/US2012/022595
§ 371 (c)(1),
(2), (4) Date: Jun. 6, 2014

(87) PCT Pub. No.: WO2013/112147
PCT Pub. Date: Aug. 1, 2013

(65) Prior Publication Data
US 2014/0357220 A1 Dec. 4, 2014

(51) Int. Cl.
*H04M 11/00* (2006.01)
*H04M 15/00* (2006.01)
*H04L 29/06* (2006.01)
*H04L 12/14* (2006.01)
*H04W 4/24* (2009.01)

(52) U.S. Cl.
CPC .......... *H04M 15/57* (2013.01); *H04L 12/1407* (2013.01); *H04L 12/1485* (2013.01); *H04L 65/1006* (2013.01); *H04L 65/1016* (2013.01); *H04L 65/1063* (2013.01); *H04M 15/31* (2013.01); *H04M 15/41* (2013.01); *H04M 15/43* (2013.01); *H04M 15/62* (2013.01); *H04M 15/63* (2013.01); *H04M 15/66* (2013.01); *H04M 15/70* (2013.01); *H04M 15/725* (2013.01); *H04M 15/80* (2013.01); *H04M 15/8022* (2013.01); *H04M 15/81* (2013.01); *H04W 4/24* (2013.01); *H04M 15/39* (2013.01)

(58) Field of Classification Search
CPC ............ H04W 4/24; H04M 2215/32; H04M 1/72519; H04M 15/00
USPC .................. 455/405, 406, 550.1; 379/114.01
See application file for complete search history.

(56) References Cited

U.S. PATENT DOCUMENTS

| | | |
|---|---|---|
| 7,548,743 B2 | 6/2009 | Cai et al. |
| 7,599,478 B2 | 10/2009 | Cai et al. |
| 2007/0174400 A1 | 7/2007 | Cai et al. |
| 2008/0194233 A1 | 8/2008 | Henry |
| 2009/0089208 A1 | 4/2009 | Wu et al. |
| 2009/0193131 A1 | 7/2009 | Shi |

(Continued)

OTHER PUBLICATIONS

Automating the Generation, Deployment and Applicaitonof Charging Schemes for Composed IMS Services, by Lei Xu et al. 2007, IEEE.

(Continued)

*Primary Examiner* — Danh Le
(74) *Attorney, Agent, or Firm* — Hewlett Packard Enterprise Patent Department

(57) ABSTRACT

Method and system for differential charging. The present disclosure describes a technique that determines a charging context for charging messages from one or more application servers that are related to a blended service, receives a charging policy related based at least on the charging context, and generates a charging message based on the charging policy and/or charging context.

19 Claims, 5 Drawing Sheets

(56) References Cited

U.S. PATENT DOCUMENTS

| | | |
|---|---|---|
| 2009/0228953 A1 | 9/2009 | Hu et al. |
| 2009/0248475 A1* | 10/2009 | Choi et al. .................. 705/8 |
| 2010/0188975 A1* | 7/2010 | Raleigh .................. 370/230.1 |
| 2011/0003579 A1 | 1/2011 | Cai et al. |
| 2011/0131277 A1 | 6/2011 | Niemoeller et al. |
| 2011/0161248 A1 | 6/2011 | Cai et al. |
| 2011/0202491 A1* | 8/2011 | Pandya et al. .................. 706/47 |
| 2011/0317709 A1* | 12/2011 | Cuervo et al. .................. 370/401 |
| 2012/0101952 A1* | 4/2012 | Raleigh et al. .................. 705/304 |
| 2012/0215911 A1* | 8/2012 | Raleigh et al. .................. 709/224 |
| 2012/0225679 A1* | 9/2012 | McCann et al. .................. 455/466 |

OTHER PUBLICATIONS

Brendan Jennings et al., "Specifying Flexible Charging Rules for Composable Services", IEEE 2008.

Hanane Oumina et al., "Towards a real time charing framework for complex applications in 3GPP IP multimedia system (IMS) environment", IEEE 2007.

Infonetics Rsearch White Paper: The Changing Role of Policy Management, Levine, Shire.

Verlaenen, et al. Towards simplified specification of policies in different domains.

International Search Authority. International Search Report. Date of Mailing Jan. 17, 2013. PCT/US2013/022595 filed date Jan. 25, 2012.

* cited by examiner

METHOD AND SYSTEM FOR DIFFERENTIAL CHARGING

BACKGROUND

The present disclosure is generally directed to techniques in the field of telecommunications.

With advent of the Internet and mobile telephone technologies, new and different types of services become available to consumers. In addition to making simple cellular phone calls, more and more mobile phone subscribers are using their mobile devices for services such as GPS, texting, multimedia streaming, searching, and others. To provide these services, service providers and various standard bodies have come up with different types of architectures and systems.

One of these systems is called IP Multimedia Subsystem or IP Multimedia Core Network Subsystem (IMS), which is an architectural framework for delivering Internet Protocol (IP) multimedia services. For example, the IMS architecture is described online by, among other sources, the Wikipedia (see http://en.wikipedia.org/wiki/IP Multimedia Subsystem). It was originally designed by the wireless standards body 3rd Generation Partnership Project (3GPP), as a part of the vision for evolving mobile networks beyond GSM. Its original formulation (3GPP Rel-5) represented an approach to delivering "Internet services" over GPRS. This vision was later updated by 3GPP 3GPP2 and ETSI TISPAN by requiring support of networks other than GPRS, such as Wireless LAN, CDMA2000 and fixed line.

To ease the integration with the Internet, IMS uses IETF protocols wherever possible, e.g., Session Initiation Protocol (SIP). According to the 3GPP, IMS is not intended to standardize applications but rather to aid the access of multimedia and voice applications from wireless and wireline terminals, i.e. create a form of fixed-mobile convergence (FMC). This is done by having a horizontal control layer that isolates the access network from the service layer. From a logical architecture perspective, services need not have their own control functions, as the control layer is a common horizontal layer. However, in implementation this does not necessarily map into greater reduced cost and complexity.

DETAILED DESCRIPTION

Figure 1:
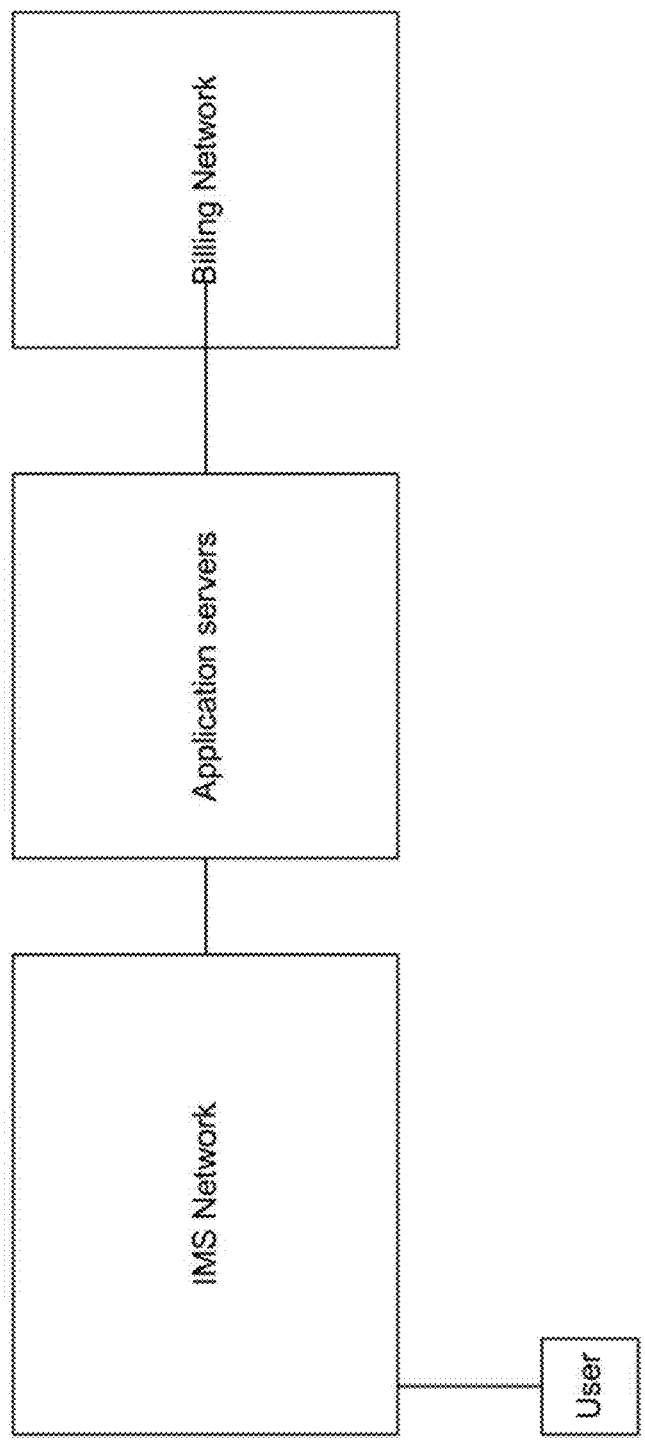
FIG. 1 is a diagram illustrating an IMS architecture with a charging system.

The present disclosure is generally directed to techniques in the field of telecommunications. More in particular, certain embodiments provide techniques for differential charging for blended services. In an embodiment, a service request that requires multiple services is processed by a service broker, which delegates these services to multiple application servers. The application servers, upon performing or having performed these services, send charging messages to a charging gateway. The charging gateway correlates charging messages received from the application servers and determining a charging context. Based on the charging context and the charging policy, which may be obtained from a policy server, the charging gateway provides charging related information to an online charging system. In a specific embodiment, the service broker embeds correlation identification to services that are a part of a blended service when delegating these services to various application servers, and the correlation identification allows the charging gateway to correlate charging messages. Policies retrieved from a policy server are used in conjunction with the charging context to determine charges associated with the blended service. There are other embodiments as well.

Providing services under the IMS architecture offers various benefits and advantages. Unfortunately, existing techniques for IMS are often inadequate for various applications. Therefore, improved methods and systems are desirable.

In the past two decades, the world saw an increased use of mobile devices and services, both in the amount and the varieties offered. Not only do people use mobile devices more, but they use mobile devices in more ways. For example, in the past people mainly use mobile devices for making voice calls; now people rely on mobile devices for many more services such as location services, instant messaging, and others. Among other things, global trends indicate that the operators are experiencing is decrease in voice revenues and an increase in subscriber traction towards rich multimedia services. For example, instead of calling a telephone directory service to ask for directions, a user may simply use her mobile device to access an available communication network to obtain directions.

As described above, the IMS architecture is a widely adopted architecture. Among other things, the IMS was envisioned to provide a universal service delivery network enabling delivery of rich multimedia services. It also facilitates chaining various application servers, thereby enabling delivery of blended services. It is to be appreciated that the blended services will gain significant importance in emerging telecommunication markets, which could be predominantly prepaid. As an example, a blended service could be an SMS request from a mobile service subscriber requesting a suggestion for a restaurant recommendation. To serve this subscriber, the service provider may need to determine the approximate location of the subscriber, search for restaurants that are net the location of the subscriber, and send a response via SMS back to the subscriber listing one or more restaurants and locations thereof.

One of the major challenges for the network operators is managing and monetizing the blended services. Current trends indicate that the emerging telecom markets are mostly driven by prepaid services. For example, market surveys show that one of the strategies to sustain the competition is to intelligently charge subscribers in real time. In such scenarios, traditional voice based charging model is Out the right choice for charging of blended services. So the service providers are looking for ways to introduce innovative real time charging, methodologies in their networks. Providing blended services often requires participation and involvement of multiple services providers and/or application server entities. This shift in service model demands a change from traditional online charging solutions, which are based on "one-size-fits-for-all" charging models, to a "differential-charging" model. One such intelligent charging methodology could be using a "differential-charging" model.

For example, a "differential charging" model allows charging subscribers differentially based on various parameters such as service context, location, time of day, type of content, mode of connectivity, and others. It is to be understood that the term "differential charging" should not unduly limit the scope of claims. Among other things, the differential online charging methodology demands an integrated policy and online charging solutions. Certain embodiments provide an architecture where charging processes and policies can work together at the service layer, thereby enabling differential online charging for blended services.

As an example, differential charging refers to an intelligent charging methodology charging of subscriber is not only done based on the service a subscriber has consumed, but many other parameters will also be taken in to consideration. These parameters may typically constitute information like location, the context in which service was invoked (i.e., whether service was invoked as a standalone service or was invoked as part of blended service), time of day, mode of connectivity, subscriber group, and others. Based on the policies configured, an appropriate charging scheme can be applied. Depending on the parameters, some policies may increase/decrease the actual price of the service consumed, or in some cases even may provide the service free of cost.

In various embodiments, an IMS architecture enables an interworking of charging and policy framework at the service layer of IMS networks. The IMS architecture enables operators to dynamically introduce and enforce new charging policies without modifying the service logic. In addition, the IMS architecture provides a scalable solution for online differential charging of blended services.

Embodiments of described in the present disclosure afford various benefits. For example, a network architecture according to various embodiments provides differential online charging for blended services in IMS networks. A functional architecture and methodology allow the charging and policy framework to work together at the service layer of IMS networks, thereby providing an online differential charging capability for blended services. For example, a methodology for dynamically altering the Diameter message (which is typically used for charging/billing) based on policies is configured for blended services in IMS networks, thereby enabling online differential charging. Among other things, models for representing the charging policies in IMS networks can be used for blended services.

FIG. 1 is a diagram illustrating an IMS architecture with a charging system. This diagram is merely an example, which should not unduly limit the scope of the claims. One of ordinary skill in the art would recognize many variations, alternatives, and modifications. As shown in FIG. 1, a user (e.g., a mobile subscriber) is connected to the IMS Network, which provides various services, such as voice, data, and/or other services. Application servers are connected to the IMS Network to perform services. The Billing Network, which may be a part of the IMS Network or an independent Network provides billing related services.

Figure 2:
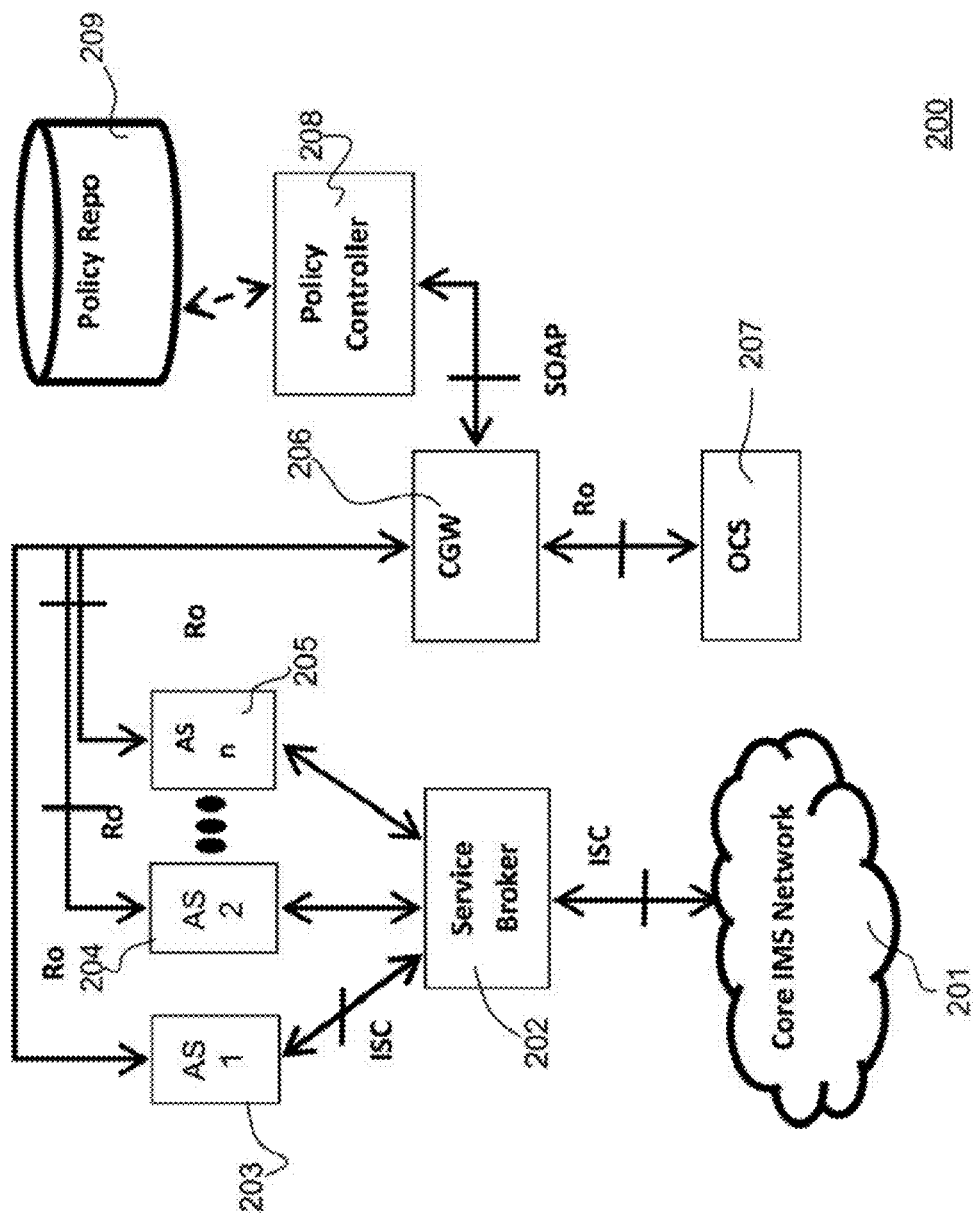
FIG. 2 is a simplified diagram illustrating an IMS architecture 200.

FIG. 2 is a simplified diagram illustrating an IMS architecture 200 according to various embodiments. This diagram is merely an example, which should not unduly limit the scope of the claims herein. One of ordinary skill in the art would recognize other variations, modifications, and alternatives. The IMS architecture 200 as shown comprises a core IMS network 201. Among other things, the core MS network 201 provides various voice and/or data services for mobile phone subscribers. In various embodiments, the core IMS network 201 is connected to various types networks for providing blended services, such as voice network, 3G data network, WLAN network, and others.

The IMS architecture 200 includes a service broker 202. Among other functions, the service broker 202 is configured to process blended service requests from the core IMS network 202. For example, a blended service request from the core IMS network is sent as an SIP message, which is compliant with the session initiation protocol (SIP). But it is to be understood that other message formats are possible as well. Depending on the application, the SIP message may include information related to multiple services and/or charging function addresses. Merely by way of an example, the SIP message from the core IMS network to the service broker is related to a blended service request from a mobile phone subscriber, where the subscriber sends an SMS message requesting for suggestions of restaurants near the subscriber. The fulfillment of this service request would include sending an SMS message back to the subscriber, where the SMS message sent back to the subscriber lists restaurants near the subscriber and information thereof. For example, this service is referred to as a blended service because it involves different services that may need to be fulfilled by different entities or application servers. In this example, the blended service includes (1) determining the location of the subscriber; (2) looking up restaurants near the subscriber's location; and (3) sending an SMS message with a restaurant listing back to the subscriber.

The service broker 202 is configured to determine how to fulfill the blended service, which may require more than one application servers to process. Once the service broker 202 determines which application servers to perform services, the service broker 202 generates service request messages (e.g., SIP messages) that are to be sent to respective application servers. As shown, the service broker 202 sends service request messages to the application servers 203, 204, and 205, each service request message is for a distinct service. For example, the service broker 202 sends location service request to the application server 203, directory service request to application server 204, and SMS service request to application server 205. The service request messages from the service broker to the application servers can be in SIP or other types of format. For the purpose of providing the blended service and later charging the subscriber, the service request messages from the service broker include a set of service related information. Depending on the application, the set of service related information may include charging information, service context, correlation identification, and others. For example, the correlation identification is provided so that later these different services can be rotated to the blended service as needed (e.g., in case of charging for the blended service).

In response to the service request (e.g., SIP messages) received from the service broker 202, the application servers 203, 204, and 205 respectively perform the requested services. For the services they have performed, application servers 203, 204, and 205 respectively generate charging messages. For example, the charging messages can be in compliance with the IMS network and are Diameter messages, which is under the "Diameter" protocol and the TS32.299 specification. Among other things, a Diameter message is used to exchange online charging information with an online charging system (OCS). It is to be appreciated, that the application servers may send other types of message for charging information. Typically, in a conventional IMS architecture, an application server sends a Diameter message to the OCS directly with various charging related information. For example, the Diameter message would include parameters such as Rating-Group and Service-Identifier AVPs (Attribute Value Pair) to apply an appropriate rating plan for a subscriber and to bill accordingly.

Instead of directly communicating with the OCS, the application servers as shown in FIG. 2 send Diameter messages to a charging gateway (CGW) 206. In various embodiments, the CGW 206 modifies the AVPs as needed for differential charging by applying appropriate charging policies. For example, the CGW 206 enhances AVPs with information that correlates related services (e.g., location service and directory service for restaurant listing). The charging policies are based on various parameters. For typical services, these parameters include subscriber context, location, time of day, subscriber-group etc. For blended services, the service context is important and needs to be considered for differentially charging a subscriber. That is, for different but related services that are a part of blended service, various factors are considered in determining the charging context and appropriate charging policies.

As shown in FIG. 2, the charging gateway 206 is connected to a policy controller 208, which has access to the policy repository 209. For example, the charging gateway acts as a proxy for the online charging system (OCS) 207. As an example, the charging gateway 206 receives various Diameter messages. As describe above, Diameter protocol is an accounting protocol for networks. One type of Diameter messages is the CCR messages from the application server. The CCR messages from the application servers are received by the charging gateway 206. For example, the CCR messages are charging requests under the Diameter protocol that are eventually to be processed by the OCS.

Upon receipt of the CCR messages from the application servers, the charging gateway 206 determines the charging context from the CCR messages. For example, charging context comprises Service-Context-Id, CC-Correlation-Id and Service-Identifier AVPs. Depending on the application, the charging context may include other information as well. The correlation identification and AVPs help the charging gateway 206 to correlate the various services invoked in the context of the blended service. Referring to the earlier example, location service, directory service, and SMS messaging service are performed to provide one or more restaurant suggestions to the subscriber requesting them. For example, the charging gateway 206, using at least the correlation identification and/or service identifier AVPs, determines that location, directory, and SMS messaging services are all related to a single blended service. The three services in this example are charged together as a blended service as opposed to distinct services charged individually. The service provider may provide a flat rate service charge for the SMS directory service, which can be higher or lower than the total costs of three separate unrelated services.

In addition to determining the appropriate charging context, the charging gateway 206 also determines which charging policies to apply. As shown in FIG. 2, the charging gateway 206 communicates with policy controller 208 to obtain appropriate charging policy. For example, the charging gateway 206 provides charging context to the charging controller 208 and requests the charging controller 208 to provide an appropriate policy. In various embodiments, the policy controller 208 processes the charging context and request from the charging gateway 206 and determines the appropriate charging policy, which is retrieved from the policy repository 209. The policy controller 208 provides the policy to the charging gateway 206.

Once charging policy is received, new Rating-Group and Service-Identifier AVPs are calculated. The charging gateway 206 enforces the charging policy by modifying the Diameter message received from the application server (or generating a new Diameter message) accordingly. With the modified (or new) Diameter message sent to the online charging system 207, the charging gateway 206 ensures that a differential rating group/tariff plan is applied by online charging system 207 to reflect the blended service provided. For example, location, directory, and SMS services may individually be associated with a specific policy and/or charge. By determining that these services are performed in the blended service context of providing an SMS restaurant suggestions for the requesting subscriber, the charging gateway 206 obtains the appropriate policy from the policy controller 208. Once the appropriated policy for the blended service has been obtained, the charging gateway 206 modifies Diameter messages from the application servers and sends the modified Ro messages to the online charging system 207.

Figure 3:
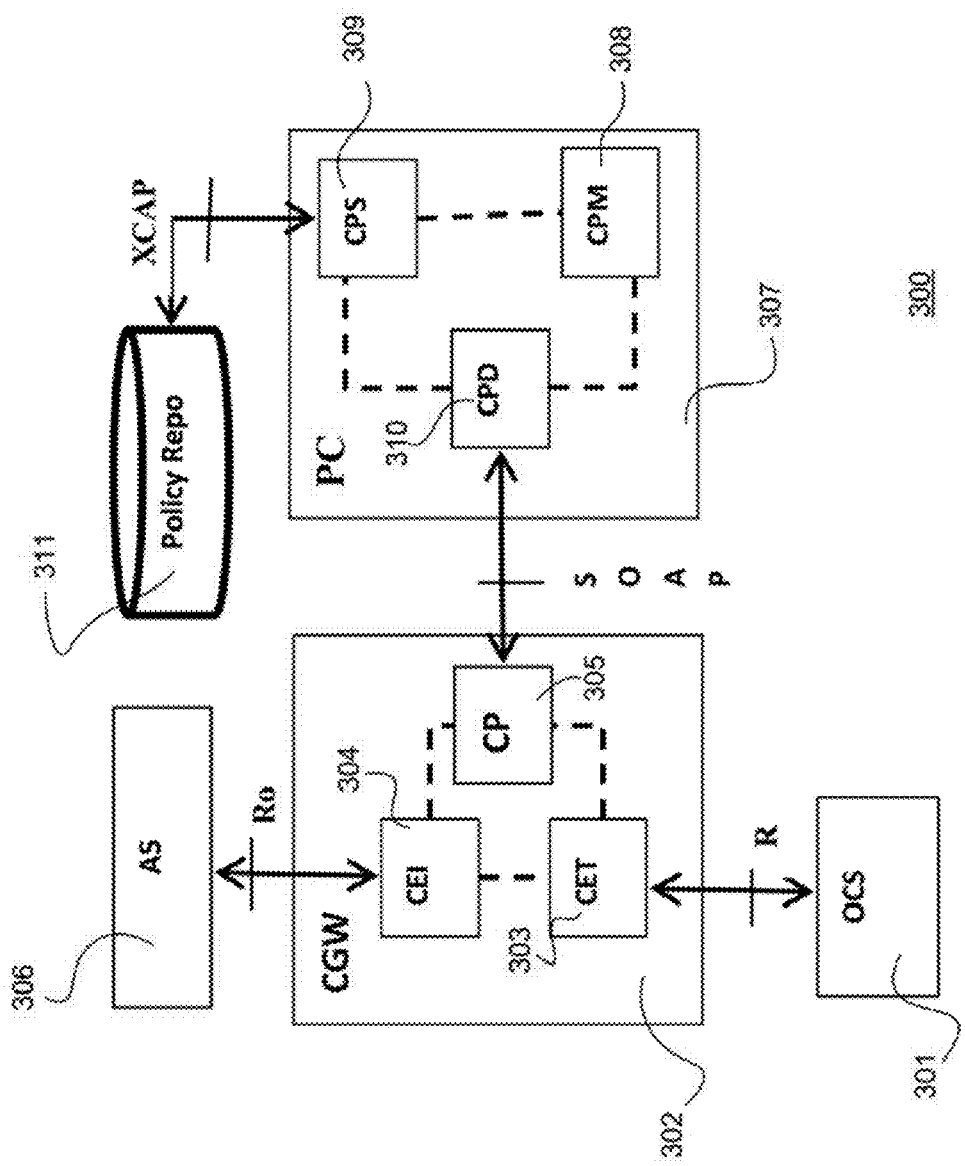
FIG. 3 is a simplified diagram illustrating operation of charging gateway.

FIG. 3 is a simplified diagram illustrating operation of charging gateway. This diagram is merely an example, which should not unduly limit the scope of the claims herein. One of ordinary skill in the art would recognize other variations, modifications, and alternatives. As an example, the charging gateway 302 can use used in the IMS architecture 200 described above. The charging gateway 302 as shown communicates with the application server 306, the online charging system 301, and the policy controller 307. In an embodiment, the charging gateway 302 comprises three functional blocks: charging event interceptor (CEI) 304, charging policy enforcer (CP) 305, and charging event transformer (CET) 302. It is to be understood that CEI 304, CP 305, and CET 302 are merely functional blocks provided for illustration purpose and could be implemented as separate or combined components of the charging gateway 302.

The charging event interceptor 304 intercepts the incoming Diameter charging messages from the application server 306, which may be involved in delivering a portion of a blended service. The charging event interceptor 304 may receive Diameter messages from different application servers (e.g., including application server 306). Upon receiving a Diameter message, the charging event interceptor 304 decodes information contained in the received Diameter messages, which may include Service-Context-Id, Service-Identifier, CC-Correlation-Id, Attribute Value Pair, and/or others. Using the decoded information, the charging event interceptor 304 determines the charging context. For example, referring to the SMS directory service example, the charging event interceptor 304 determines whether an incoming charging message from the application server 306 for a location service has a correlation ID associated with the blended service of locating a nearby restaurant for the subscriber. Based on the correlation ID and/or other information contained in the charging message, the charging event interceptor 304 determines that the charging message should not be treated as a distinct charge, but should instead be treated under the charging context of the blended service.

To determine which charging policy should be applied, the charging gateway 302 needs to interface with the policy controller. As shown in FIG. 3, the charging event interceptor 304 sends the charging context in nation to the charging policy enforcer 305, which uses the charging context to obtain appropriate policy from the policy controller 307. The charging policy enforcer 305 is responsible for interacting with the policy controller 307 and enforcing the policies received from the policy controller 307.

In an exemplary embodiment, the charging policy enforcer 305 sends charging context provided by the charging event inceptor to the policy controller 307 using the Simple Object Access Protocol (SOAP) interface. It is to be understood while the SOAP interface is used in this example and in FIG. 3, other interfaces and/or protocols can be used as well. By providing the charging context to the policy controller 307, the charging policy enforcer 305 is able to receive the appropriate policy from the policy controller 307. Once the appropriate policy is received, a new set of charging data is generated. For example, new Rating-Group and Service-Identifier AVPs are calculated and then communicated to the charging event transformer 302.

The charging event transformer 303 is responsible it creating a new charging request message (or a modified version of the charging request message received from the application server), which contains the new Rating-Group and Service-Identifier AVPs provided by CPE and sending the new charging request message to the online charging system 301. For example, the newly created charging request can be compliant with the Diameter protocol. In addition, the charging event transformer 303 manages various communication and/or interactions between the charging gateway 302 and the online charging system 301.

As described above, the policy controllers 307 obtains appropriate charging policies based on the charging context received from the charging gateway 302. FIG. 3 shows that the policy controller 307 comprises three functional blocks: charging policy decision (CPD) 310, charging policy store (CPS) 309, and charging policy management (CPM) 308. It is to be understood that CPS 309, CPD 310, and CPM 308 are merely functional blocks provided for illustration purpose and could be implemented as separate or combined components of the policy controller 307.

The charging policy decision 310 as shown interfaces with the charging gateway 302. As an example, the charging policy decision 310 comprises a SOAP interface for the charging gateway 302. It is to be understood that while the SOAP interface is shown in FIG. 3, other types of interfaces and/or protocols can be used as well. The charging policy decision 310 is responsible for identifying and evaluating an appropriate charging policy for the given charging context. The charging policy decision 310 analyzes the charging context received from the charging gateway 302 (e.g., from the charging policy enforcer 305), and based on the charging context an appropriate charging policy can be obtained. For example, the charging policy decision 310 fetches the appropriate charging policy from the charging policy store 309. Once the appropriate charging policy is obtained, the charging policy decision 310 sends the charging policy to the charging gateway 302. For example, charging policy decision 310 sends the charging policy as a SOAP response.

The charging policy store 309 is provided to facilitate to fetching the charging policy requested by the charging policy decision 310. For example, all policies can be represented in XML format and stored in and XML Document Manager (XDMS). It is to be understood charging policy can be represented in other formats as well. The charging policy store 309 communicates with the policy repository 311 to retrieve charging policies. As an example, the policy repository 311 can be implemented as a part of the policy controller 307.

The charging policy store 309 is connected to the charging policy management 308. The charging policy management 308 is configured to provide an interface to manage the various policies. For example, charging policies obtained by the charging policy store 309 is managed by the charging policy management 308 before provided to the charging policy decision 310.

Figure 4:
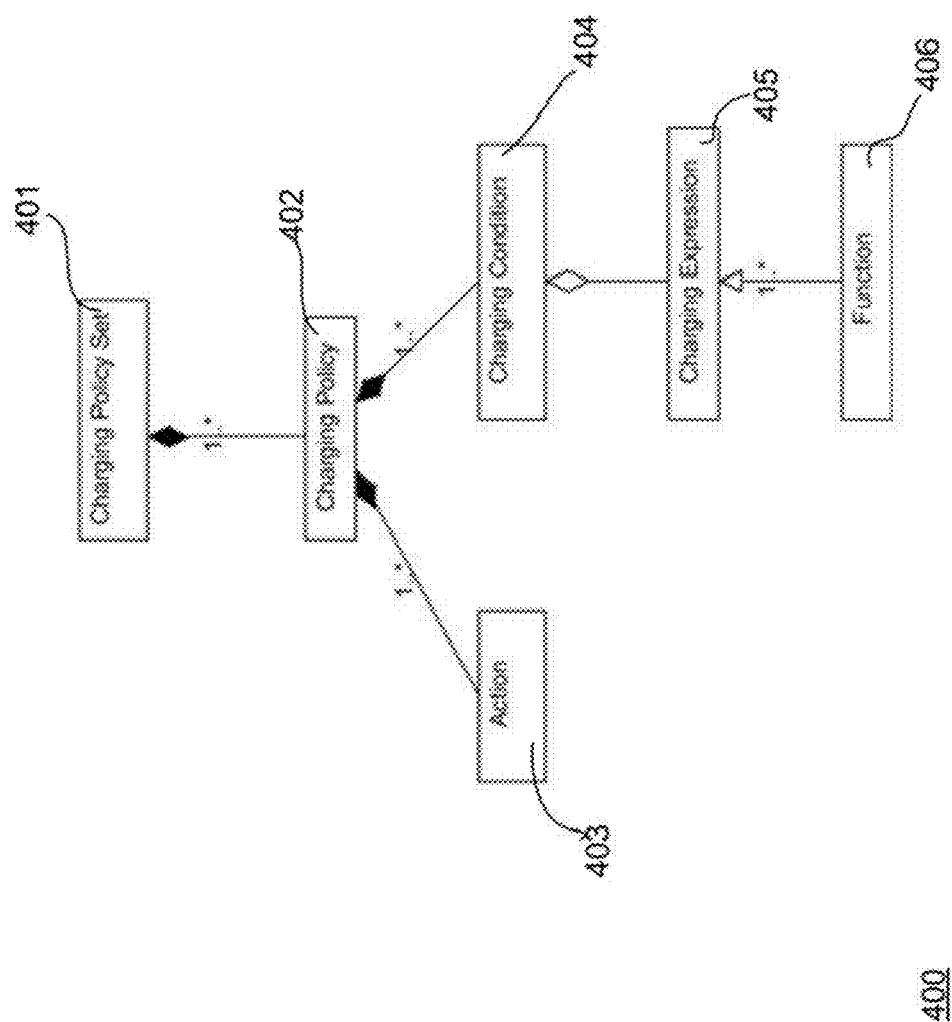
FIG. 4 is a simplified diagram illustrating a charging policy model 400.

Depending on the application, the charging policies can be implemented in various ways. FIG. 4 is a simplified diagram illustrating a charging policy model 400. This diagram is merely an example, which should not unduly limit the scope of the claims. One of ordinary skill in the art would recognize many variations, alternatives, and modifications. A charging policy set 401 comprises at least charging policy 402. The charging policy 402 is a combination of conditions (e.g., condition 404) and actions (e.g., action 403). The combination of action 403 and condition 404 specifies on how a given charging event should be handled in various scenarios. For example, the charging policy 402 can have one or more conditions that are expressed by charging expressions (e.g., charging expression 405), which can be one or more charging functions (e.g., charging function 406). For example, these functions evaluate to a Boolean expression.

Figure 5:
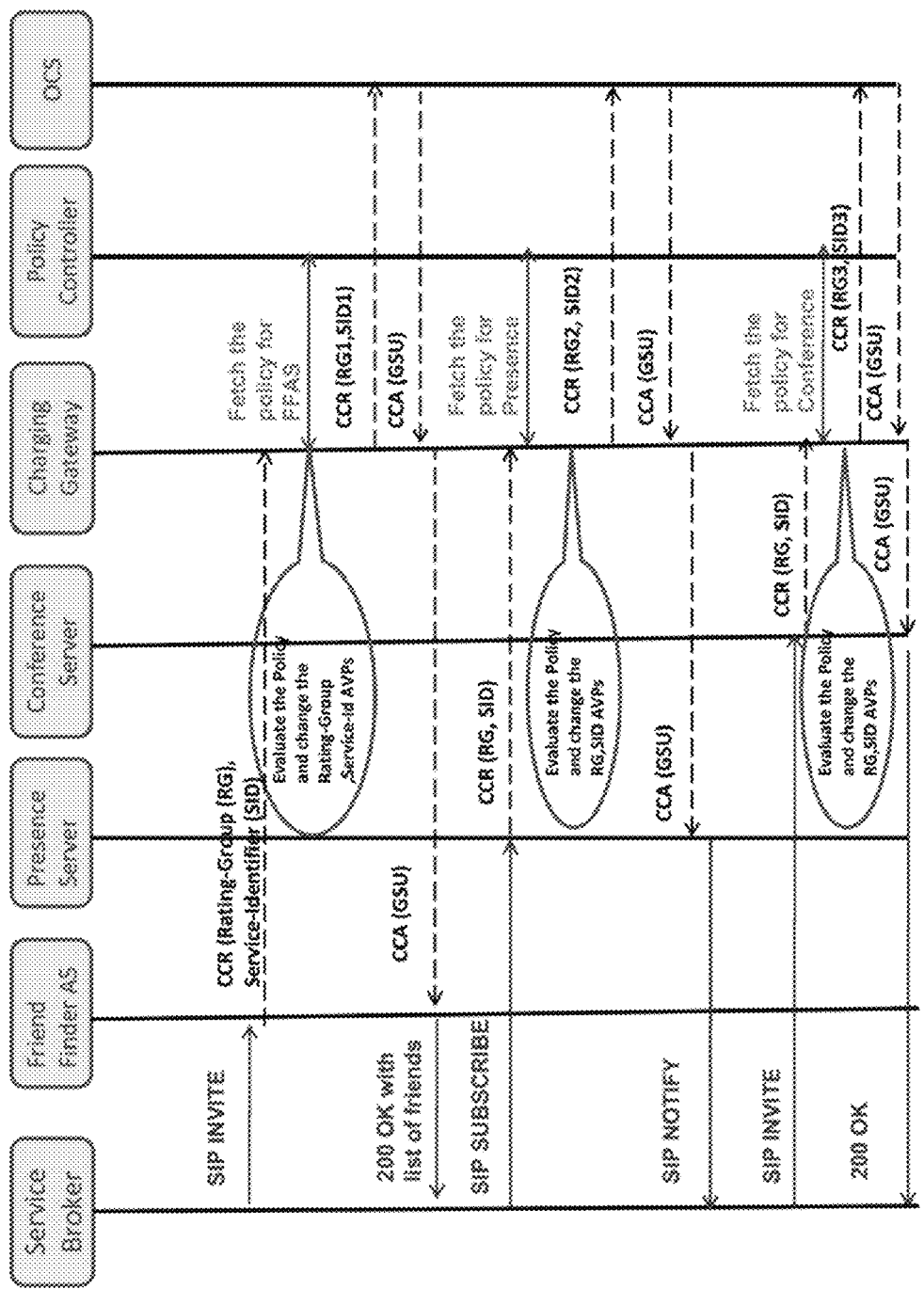
FIG. 5 is a simplified diagram illustrating operation of an IMS architecture.

FIG. 5 is a simplified diagram illustrating operation of an IMS architecture. This diagram is merely an example, which should not unduly limit the scope of the claims. One of ordinary skill in the art would recognize many variations, alternatives, and modifications. When a service is to be performed, the service broker, sends an SIP invite message to a friend finder service application server for the application server to performed one or more services. The application service performs the service, and sends a charging message, which can be a credit control request (CCR), to the charging gateway for the service performed. By analyzing the charging message, the charging gateway determines the charging context for the service performed and fetches charging policy from the policy controller. Using the charging policy received from the policy controller, the charging gateway generates a new charging message for the service performed and sends the new charging message (e.g., a new CCR) to the online charging system. In response to the new charging message, the OCS sends a credit control answer (CCA) back to the charging gateway, which sends the CCA to the friend finder application server. Similarly, if the service broker sends service request to the presence server or conference server, respective charging messages (CCR) are processed by the charging gateway to determine the their charging context and retrieve the appropriate charging policies. The charging messages are not restricted to CCR and CCA formats. For example, in an offline charging system, different types of charging messages can be used as well.

While the above is a full description of the specific embodiments, various modifications, alternative constructions and equivalents may be used. Therefore, the above description and illustrations should not be taken as limiting the scope of the present disclosure which is defined by the appended claims.

What is claimed is:

1. A method for providing differential charging for blended services, the method comprising:
   receiving a blended service request by a service broker module, the service request being associated with at least a first service and a second service;
   generating a correlation identification associated with the blended service request;
   identifying a first application server for providing the first service;
   sending a first service request from the service broker module to a first application server, the first service request comprising information for the correlation identification and the first service;

generating a first charging message by the first application server, the first charging message being associated with the first service;

identifying a second application server for providing the second service;

sending a second service request from the service broker module to the second application server, the second service request comprising information for the correlation identification and the second service;

generating a second charging message by the second application server, the second charging message being associated with the second service;

receiving the first charging message and the second charging message by a gateway module;

determining a charging context between the first charging message and the second message by the gateway module based at least on the correlation identification;

retrieving at least a first policy from a policy module based at least on the charging context; and generating a set of parameters based at least on the first policy and the context.

2. The method of claim 1 wherein the online charging system is in accordance with the IMS.

3. The method of claim 1 further comprising determining the first service and the second service by the service broker module.

4. The method of claim 1 further comprising:

generating a third charging message by the gateway module, the third charging message comprising the set of parameters;

sending the third charging message to an online charging system.

5. The method of claim 1 further comprising determining a service ID rating group and a context ID for the first charging message and the second charging message.

6. A method for differential charging, the method comprising:

receiving a first charging message from a first application server, the first charging message being associated with a blended service, the first charging message comprising a correlation identification;

analyzing the first charging message based at least on the correlation identification;

associating the first charging message with the blended service;

determining a charging context for the first charging message;

obtaining a charging policy based at least on the charging context; and generating a second charging message based on the first charging message and the charging policy.

7. The method of claim 6 wherein the first charging message further comprises a service identification, rating group and a service context identifier and other attribute value pairs.

8. The method of claim 6 further comprising accessing a policy database.

9. The method of claim 6 further comprising sending the second charging message to an online charging system.

10. The method of claim 6 further comprising:

receiving a third charging message from a second application server;

associating the third charging message with the first charging message based at least on the correlation identification.

11. The method of claim 6 further comprising sending the charging context to a policy controller.

12. The method of claim 6 further comprising:

analyzing the charging context;

retrieving the charging policy based on the charging context.

13. The method of claim 6 wherein the first charging message comprises an Diameter message.

14. The method of claim 6 wherein the second charging message comprises an Diameter message.

15. The method of claim 6 further comprising assigning a first portion of the blended service to the first application server by a service broker.

16. A system for providing differential charging, the system comprising:

a charging gateway device comprising a network interface and a processing module, the network interface being connected to a plurality of application servers, the plurality of application servers including a first application server, the network interface being configured to receive one or more charging messages, the one or more charging messages including at least a first charging message, the first charging message including a correlation identification related to a blended service, a processing module being configured to analyze at least the first charging message and determining a charging context associated with the first charging message, the charging gateway device; and a policy controller device being configure to receive the charging context from the charging gateway device and provide a charging policy based on the charging context, wherein the charging gateway device is configured to a generate a second charging message based at least on the charging policy provided by the policy controller.

17. The system of claim 16 further comprising an online charging system for processing the second charging message.

18. The system of claim 16 further comprising a policy repository wherein the policy controller retrieves the charging policy from policy repository.

19. The system of claim 16 further comprising a service broker device configured to assign a blended service as a plurality of services respective to a plurality of application servers.

* * * * *